United States Patent
Steven et al.

(10) Patent No.: US 6,689,247 B1
(45) Date of Patent: Feb. 10, 2004

(54) PREFORMED STRIP AND METHOD FOR SPLICING CONVEYOR BELTS

(75) Inventors: Robin Bovaird Steven, Dublin, OH (US); Houston Channing Brown, West Mansfield, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/030,949

(22) PCT Filed: Jul. 21, 1999

(86) PCT No.: PCT/US99/16489

§ 371 (c)(1),
(2), (4) Date: Jan. 8, 2002

(87) PCT Pub. No.: WO01/07796

PCT Pub. Date: Feb. 1, 2001

(51) Int. Cl.[7] ............................. B65G 15/36; F16G 3/00; F16G 3/10
(52) U.S. Cl. ....................... 156/304.5; 156/304.3; 156/137; 156/267; 474/253; 474/255; 198/844.2
(58) Field of Search .................................. 156/137, 502, 156/266, 304.1, 304.3, 304.5, 304.6, 250, 254, 267, 157, 159; 198/844.2; 24/38; 474/253, 255; 83/23

(56) References Cited

U.S. PATENT DOCUMENTS

| 3,076,736 | A | * | 2/1963 | McHugh | 474/254 |
| 3,487,871 | A | | 1/1970 | Kanamori | |
| 3,689,341 | A | * | 9/1972 | Ninomiya | 156/159 |
| 6,554,934 | B1 | * | 4/2003 | Steven et al. | 156/137 |

FOREIGN PATENT DOCUMENTS

| DK | 2202090 | 7/1973 | F16D/3/12 |
| EP | 0372510 | 6/1990 | F16G/3/10 |
| FR | 2265638 | 10/1975 | B65G/15/36 |

* cited by examiner

*Primary Examiner*—Sue A. Purvis
(74) *Attorney, Agent, or Firm*—Richard B. O'Planick; David L. King

(57) ABSTRACT

A preformed strip (20) of unvulcanized rubber having two-strand receiving grooves portions (22A and 22B) for splicing the ends (11, 12) of steel cord or strand reinforced rubber conveyor belts (10) is disclosed along with a method of forming the spliced joint.

6 Claims, 6 Drawing Sheets

PREFORMED STRIP AND METHOD FOR SPLICING CONVEYOR BELTS

TECHNICAL FIELD

This invention relates to a method and apparatus for forming splices at the ends of conveyor belts.

BACKGROUND OF THE INVENTION

Conveyor belts are commonly used as a means to move material from one location to another. In large mining operations, the conveyor belt is generally formed of a rubber body embedded with steel cords or strands. A cover compound can be used at the surface wherein the material is to be conveyed. Generally the compound is very abrasion and cut resistant and of sufficient thickness to prevent the rocks being conveyed from tearing the belt. A pulley compound can be used on the interior surface, this rubber is ideally suited for improved wear as the belt traverses over the pulleys used to drive the belt.

These steel corded or stranded belts may extend several miles and cost millions of dollars to install and fabricate. The fabrication of such belts occurs initially at a factory wherein steel strands or cords are arranged in a coplanar relationship parallel to the surface of the belt so that the belt will exhibit uniform expansion and minimize weaving as it traverses which can cause belt damage.

The prior art method of fabricating belts requires the steps of vulcanizing the rubber belt and winding it onto large spools for shipping to the site. Once the spools of belt are received at the site, the ends must be prepared for splicing by removing the vulcanized rubber from the strands over a distance determined to be sufficient to provide enough joint length to make a secure splice.

Removal of the rubber can be a very time consuming and tedious task. Often times piano wire is used to peel the vulcanized rubber from the strands. In large belts of several feet in width over a hundred strands must be exposed at each joint end. Once exposed, the strands had to be cleaned of as much of the vulcanized rubber as possible. The strands were then cleaned with solvents such as toluene and then a bonding agent was applied comprising a 3:2 mixed solution of "Chemlok No. 203" and xylene, for example, and rubber cement is applied to the strands and dried. After the preparation of both ends as described in U.S. Pat. No. 3,487,871 entitled "A METHOD OF JOINING CONVEYOR BELTS HAVING STEEL CORDS EMBEDDED THEREIN" granted Jan. 6, 1970, a joining member is formed made of vulcanized or semi-vulcanized rubber of the same quality as the rubber used in the formation of the belt. The upper face of the member is preferably made of a non-vulcanized rubber and provided with a plurality of strand receiving grooves. Once the strands are in place, a bonding agent of the type described above is preferably coated on the faces of the surfaces to insure complete bonding. While this prior art patent use the term "non-vulcanized rubber" being preferable at the melting surfaces of the otherwise vulcanized or semi-vulcanized member (13), it is believed that the term means "having at least its upper surface formed of incompletely vulcanized rubber" as was required in the claim of the patent. An important limitation when the member for splicing is semi-vulcanized at this grooved surface, the use of semi-cured rubber forced the use of bonding solvents. These solvents are high in VOC's and the liberal use of xylene and toluene creates carcinogenic risks to the personnel. In developed parts of the world, the use of such solvents is greatly discouraged.

A second limitation of the prior art splicing member is that the member was apparently molded to the exact width of the belt and had exactly twice the number of strands as the belt. This meant that for each belt width, there had to be a unique member since conveyor belts are not standardized in width or in the size or in the number of strands to use the concept taught in that patent required specially designed molds.

A third limitation of the method of splicing described in U.S. Pat. No. 3,487,871 was that the strands had to be free of any of the vulcanized belt rubber which, if left on the strands, adversely affected the bonding.

The most relevant prior art document is considered EP-A-0 372 510 (Stahgruber Grunber & Co. Otto) which has the feature identified in the preamble of independent method claim 4.

An object of the present invention is to eliminate the need to semi-vulcanize the splicing member.

Another objective is to make the use of solvents unnecessary.

Still another objective is to eliminate the need to completely strip the strands of all vulcanized rubber prior to splicing.

A still further objective is to provide a splicing strip that can be used in multiples independent of the width of the belt or the corresponding number of strands.

A still further objective is to improve the splice strength while saving time in splice preparation.

SUMMARY OF THE INVENTION

A method of splicing the ends (11, 12) of conveyor belts (10) having vulcanized rubber (2) with steel strands (1) embedded in the vulcanized rubber is disclosed. The method has the steps of (a) removing a portion of the rubber (2) from the belt ends (11, 12) to be joined exposing a plurality of strands (1); (b) providing preformed unvulcanized strips (20) of rubber, in an array of bottom strips (20) each strip (20) having a concave quarter-circular profile wherein strips (20) when laid adjacently to each other form stand receiving grooves (22) located on an upper surface (24), (c) placing exposed strands (1) of the belt ends (11, 12) being joined in the grooves (22) of the bottom strip (20); (d) placing top strips (20) overlying the array of bottom strips (20) and vulcanizing the strips (20) together thereby forming the spliced joint In a preferred method, the step of removing the vulcanized rubber (2) exposing a plurality of strands (1) includes leaving the strands (1) at least partially sheathed in the vulcanized rubber, most preferably in a coating of the vulcanized rubber (5) whereby the step of vulcanizing the strips (20) together includes vulcanizing the strip (20) to the at least partially sheathed strands (1).

The step of providing at least two arrays of unvulcanized strips (20) of rubber includes the steps of providing at least two bottom strips (20) and positioning the strips (20) adjacently to increase the width of the strips (20), and cutting one of the at least two bottom strips (20) parallel to the grooves (22) thereby substantially matching the total width of the adjacently layered strips (20) to the conveyor belt width ($W_B$).

The array of top strips (20) of similarly grooved as the array of bottom strips (20). Preferably, the top and bottom strips are the same in cross-sectional profile.

The step of providing the top or bottom strips (20) includes the steps of extruding the strip (20), the extruder having a die (356) having a predetermined cross-section for forming the strips (20) forming the strand receiving grooves (22) of the upper surface (24).

Each strip (20) has a predetermined cross-sectional profile having a flat base, a first side and a second side extending between the flat base and an upper surface, the first side having a concave surface having a quarter-circular shape or depression intersecting the top surface and extending along the length of the strip (20).

In one alternative embodiment, the second side has a substantially straight profile. In the preferred embodiment, the second side has a concave surface having a quarter-circular shape.

Each of the above methods of splicing uses an unvulcanized elastomeric strip (20) for splicing steel cable reinforced belts (10), the strips (20) having a base ($W_S$) and length ($L_S$). The strips (20) are characterized by an uncured strip (20) having a predetermined cross-sectional profile having the base ($W_S$), an upper surface, a first side and a second side, each side extending between the base and an upper surface. The profile having two substantially quarter-circular depressions extending parallel along the length of the strip, each depression providing substantially half of a steel cable receiving groove (22) for placement of a steel cable or strand (1).

It is preferred that strips (20) has a width of the base ($W_S$) requiring a plurality of strips (20) for each splice joint.

Most preferably, the strips (20) are prepackaged in spools of continuous lengths of four or more strips (20) for each splice joint.

DETAILED DESCRIPTION OF THE INVENTION

Figure 1:
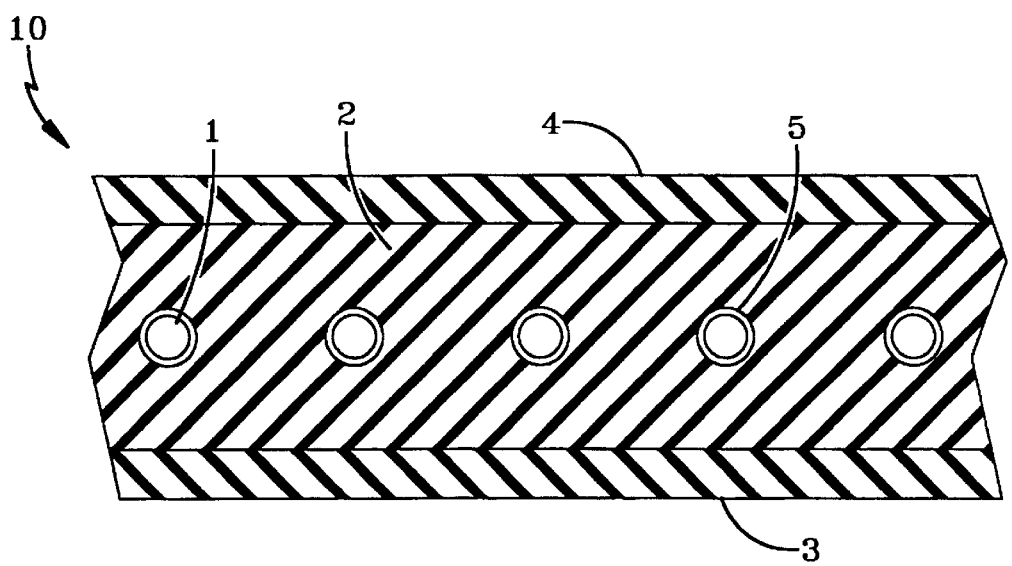
FIG. 1 is a fragmentary cross-sectional view of an exemplary belt structure having steel strands embedded in vulcanized rubber.

With reference to FIG. 1, an exemplary conveyor belt (10) will be observed. The belt (10) has a plurality of steel cords or strands (1) embedded in a core or central layer of rubber (2). As illustrated, the central layer (2) is bounded by a bottom layer of rubber (3) of a compound ideally suited for contacting the drive pulleys of the conveyor system (not shown) and a cover layer (4) of a rubber compound ideally suited for abrasion and cut resistance. Additionally, such belts (10) may include additional textile or fabric layers or alternatively are formed utilizing only a single homogeneous rubber without a top or bottom compound while the steel strands of the belt may be impregnated or coated with a thin rubber bonding layer or sheath (5) to enhance cord adhesion. Nevertheless, the present invention is ideally suite to facilitate the splicing of almost any known type of rubber conveyor belts (10) having steel cords or strands (1).

Figure 2:
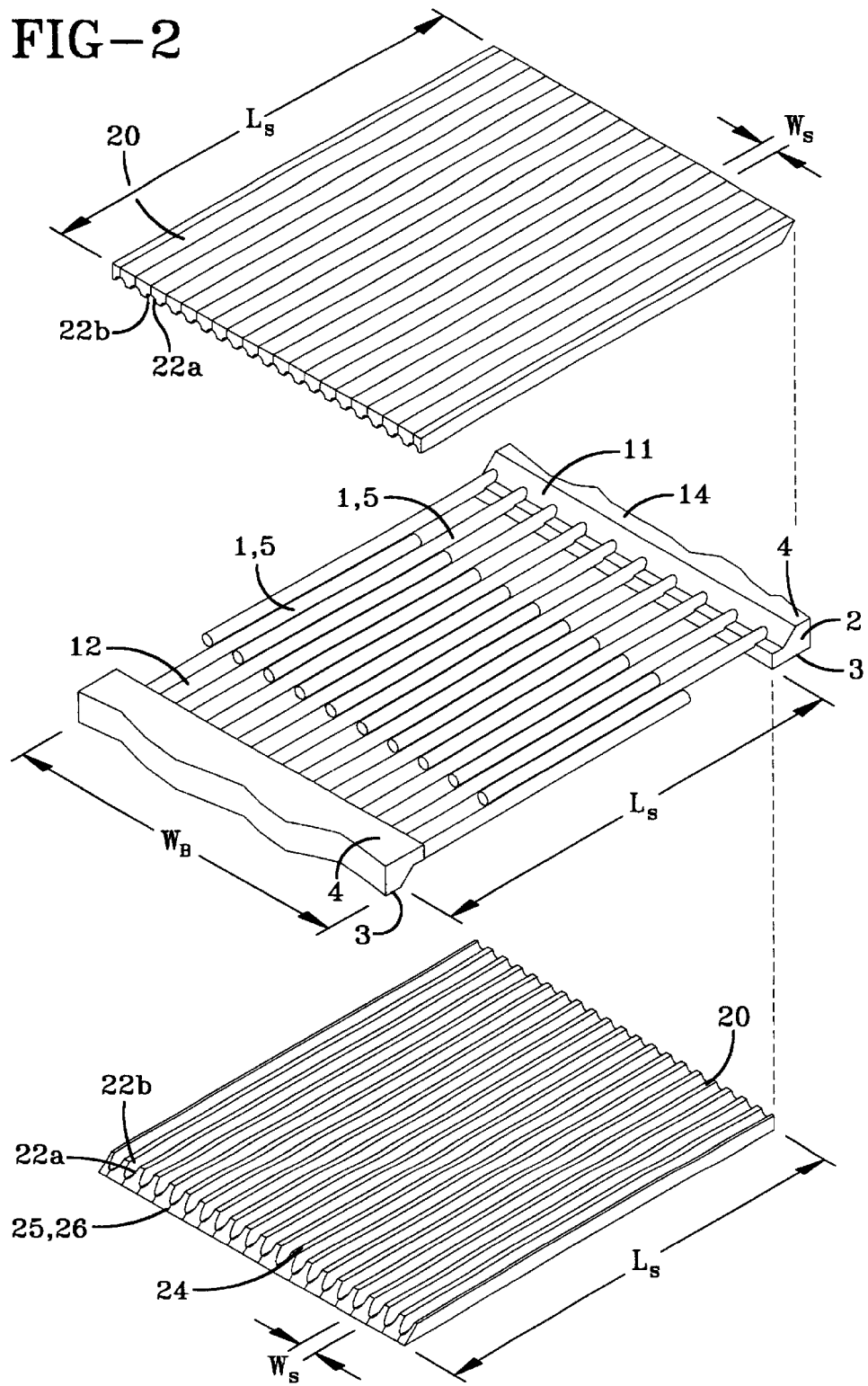
FIG. 2 is a perspective view of a belt end prepared for attachment to a corresponding belt end and a plurality of the preformed unvulcanized strips (20) of rubber for joint splicing.

As shown, preparation of the belt ends (11, 12) to be joined is illustrated in FIG. 2. The belt ends (11, 12) has a portion of the body (14) of the belt (10) removed to expose the steel strands (1). For convenience, the term "body (14) of the belt (10)" is intended to include all body elements such as the central layer (2), the bottom (3), the cover (4), and any other layers. That portion of the body (14) is removed preferably across the width of the belt in a diagonally extending direction. This insures that the splice seam will not approach a drive pulley simultaneously. Additionally the layer of rubber on the top surface of the strands may be cut back further than the lower layer of rubber below the stands, this method of ends (11, 12) preparation is commonly referred to as a sped contour. These features, although not required, can improve the splice joint in some applications.

Once the rubber body (14) is removed from an end (11, 12), the stands (1) of steel cord are exposed. In some techniques of removing the rubber body (14) steel piano wire is used to peel the rubber off the cords (1). In that method of body removal (14), virtually all of the rubber sheathing the steel cord is removed such that the cords are only at least partially sheathed in cured rubber. If desired, the remaining rubber bonded to the cords or strands can be removed by wire brushes or the like. This technique is quite tedious and time-consuming, however, and is preferably avoided.

Figure 3:
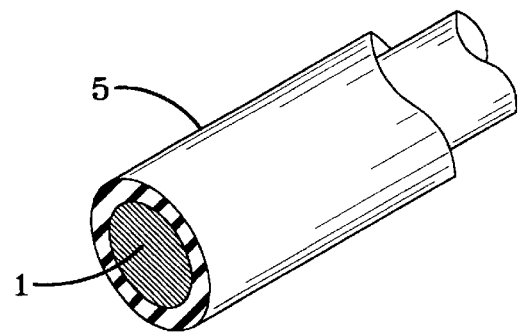
FIG. 3 is a steel cord strand shown sheathed in a coating of the vulcanized belt rubber.

An alternative method of removing the rubber body (14) includes using a means having contoured cutting surfaces that remove the rubber body (14) while leaving the strands (1) coated in a thin sheath of rubber (5) as shown in FIG. 3. In this technique, the strands (1) can be buffed to enhance the adhesion of the cured rubber sheath (5) prior to splicing the joint.

It is important to note that the present invention is ideally suited to be used on belts; wherein the strands are exposed at the end of the belts as a result of a technique of manufacture. In such a case, the step of preparing the ends (11, 12) for splicing can be avoided or modified eliminating the step of removing the cured rubber.

As shown in FIG. 2, the exposed strands or cords (1) are ideally placed in depressions (22a, 22b) in preformed strips (20) of unvulcanized rubber. These depressions (22a, 22b) each represent a portion of a strand receiving groove (22). Ideally, the number of grooves (22) per inch are twice the number of strands per inch at one end of the belt.

Each preformed strip (20) of rubber splicing has a base having a width ($w_S$) and a cut to length $L_S$ as shown in FIG. 2. The strips (20) has a top surface (24) intersected by a plural of grooves portions (22a, 22b) each groove portion being a portion of either a first side (25) or a second side (26) of the strip.

By orienting the strips (20) into an array of bottom strips (20) with the grooved portions 22a and 22b of adjacent strips

(20) form grooves (22) adjacent the strands (1), the stands (1) of one end (11) can be placed in every other groove (22) while the strands (1) of the other end (12) fills the grooves (22) remaining to be filled. The resulting strands (1) from end (11) and those from end (12) form an overlapping array of strands (1).

Since the number of stands (1) in the splice joints are approximately double the number of strands in the rest of the conveyor belt (10), it is possible to vary the length of the cords or strands (1) in a number of patterned sequences. The principle concept being that a cord (1) cut short in end (11) would be adjacent one or two long cords (1) in end (12) and vice-versa The resultant effect is that the cords' ends do not bend around the drive pulley at a simultaneous occurrence giving rise to a peak stress. While these splicing techniques are well known in the art, it is important to note that they are easily adaptable to the present invention.

Once the cords or strands (1) are all placed in the grooves (22) in a proper splicing sequence, an array of top strips (20) is placed over the splice opening covering the strands with an array of uncured rubber strips (20) on both the top and bottom.

Preferably, the top strips (20) may be grooved similar to the bottom strips (20). Most preferably, the top and bottom strips are the same in profile and composition.

Alternatively, the top may simply be a flat sheet of uncured rubber.

Dependent on the amount of opening needed for the splice joint, the strip (20) may be provided in a large spool of continuous length, in such a case, the strips may be trimmed to fit as needed.

Alternatively, the strips can be sized in terms of length to provide the optimal splicing length $L_S$ for strength and durability and no additional trimming or cutting of the strips (20) would be recommended. In this case, the belt manufacture can at least insure the splice length is sufficient.

In terms of strip width ($W_S$), an important feature of the splicing strip is that they are preformed to a base width ($W_S$) that is generally about equal to the cord (1) spacing as measured at cord centers. In bets having a width of five feet or more, it can easily be appreciated that the many strips are easier to handle if nested in a platen or fixture. The splicing operator simply can place as many strips as are needed to cover the strands and then must trim cut the last strip to substantially match the overall belt width. Ideally, this trimming simply requires taking a hot knife or similar cutting element and passing it through a groove portion (22a or 22b) of the strip (20). This procedure is applicable to both the top and the bottom of the splice joint.

Figure 4:
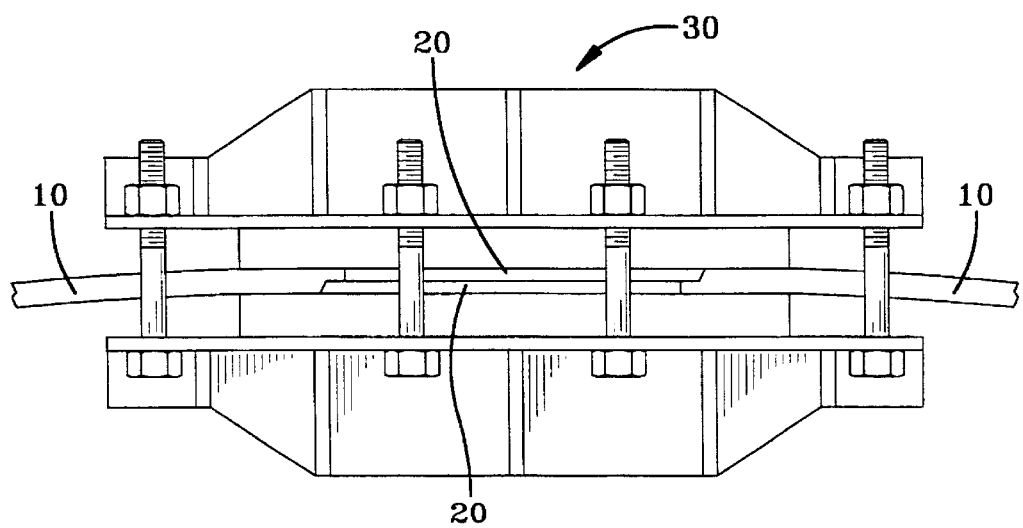
FIG. 4 is a side elevation view of a vulcanizing press for forming a belt joint in accordance to the invention.

Once the unwed strips (20) are positioned and the strands properly placed in the grooves (22), the joint area is placed in a curing press (30) as is shown in FIG. 4. Once cured, the splice is complete. The advantages of precision and quality control improvements can be easily appreciated over the more arcane techniques used in the prior art but, in addition to making a superior splice, this method can reduce splicing time by as much as half over current techniques. When one considers that as many as a hundred splices may be needed in a large mining belt, a reduction from 8 hours to less than 4 hours to complete a single splice joint has obvious cost and time savings.

Figure 5:
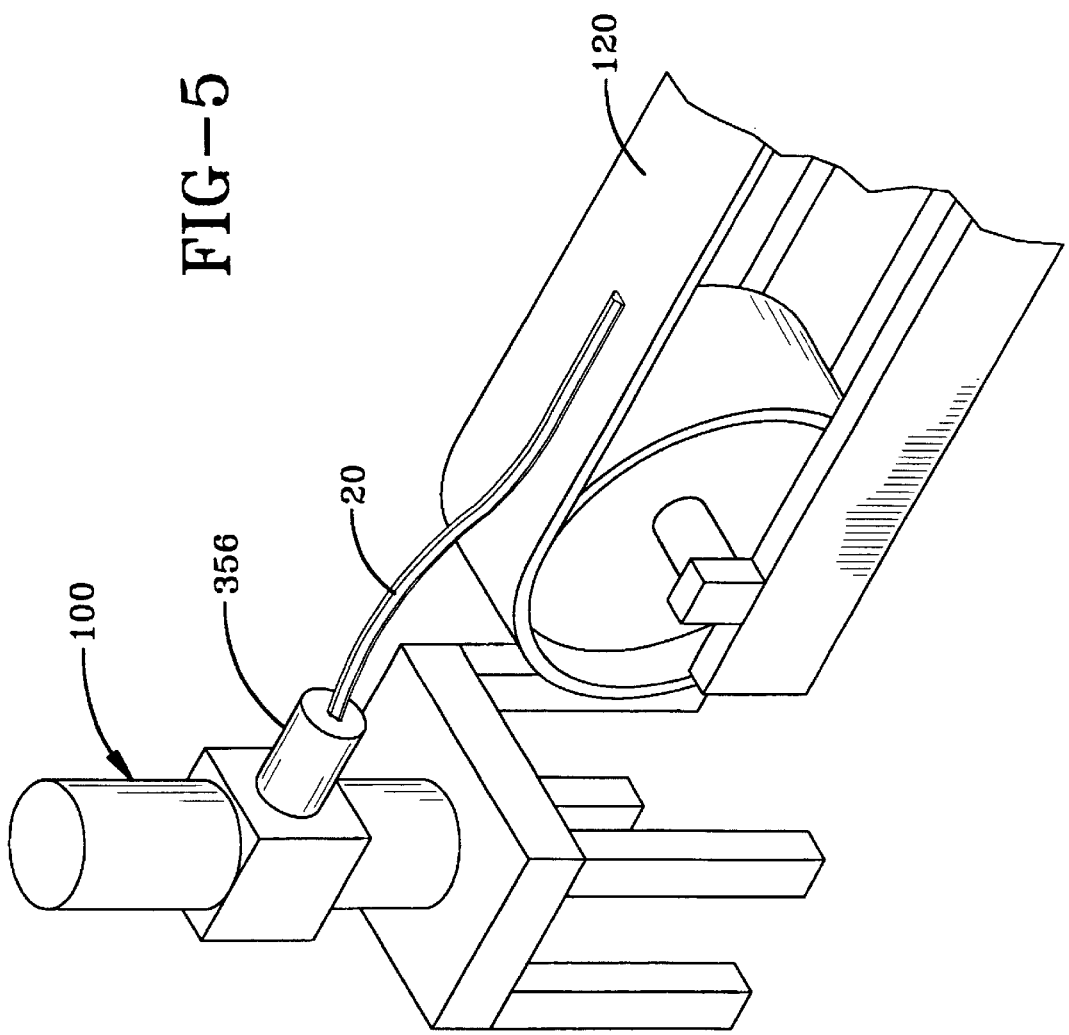
FIG. 5 is a perspective view of a extruder apparatus for forming the preformed elastomeric strip.

In FIG. 5, an extruder (100) is shown for forming the preformed elastomeric strip (20). The extruder (100) has a die head (356) that shapes the strip's profile. A conveyor mechanism (120) can be used to orient and cool the formed strip.

Figure 6:
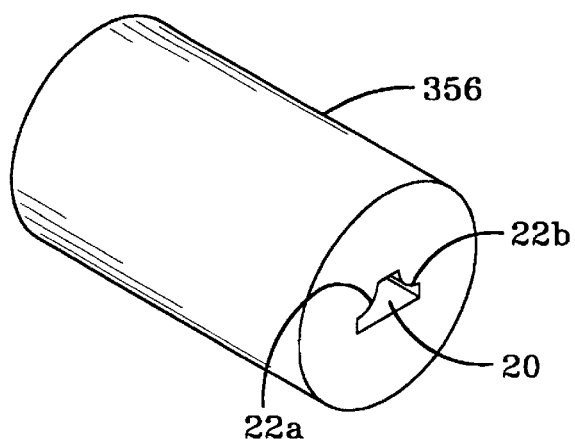
FIG. 6 is a cross-sectional view of the extruder die with a profile for forming the strand receiving grooves in the strip.
Figures 7A, 7B:
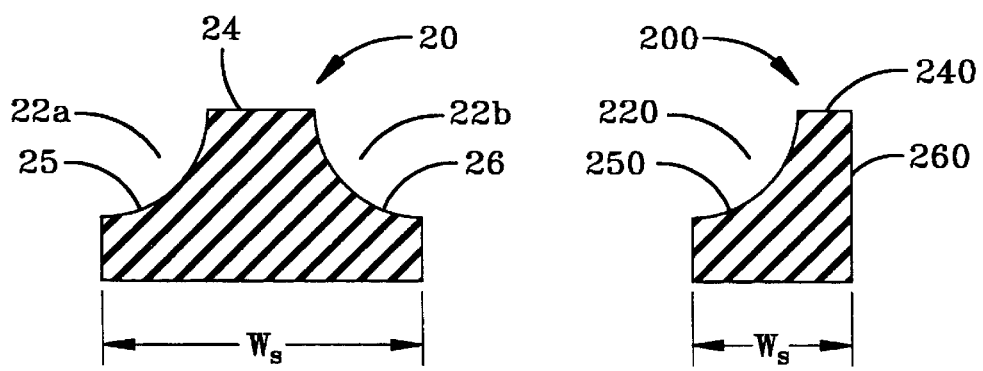
FIG. 7A is a cross-sectional view of a preferred strip (20).
FIG. 7B is a cross-sectional view of an alternative strip (200).

In FIG. 6, the die head is shown profiled to form depressions or groove portions (22a and 22b) in the cross-sectional profile of the strips (20), these groove portions (22a and 22b) form the strand receiving grooves (22). One extruder with preferably only one die head (356) having the groove forming portions (22a and 22b) can establish the overall profile of the strip (20) in a variety of sizes by simply varying he extrusion speed and tension. The strip (20) itself is formed by forming, cooling and delivering the uncured rubber to a spool (40). As the strip profile is formed, the strip (20) is transferred directly onto a conveying means (600) to allow the strip to cool.

Figures 8, 9:
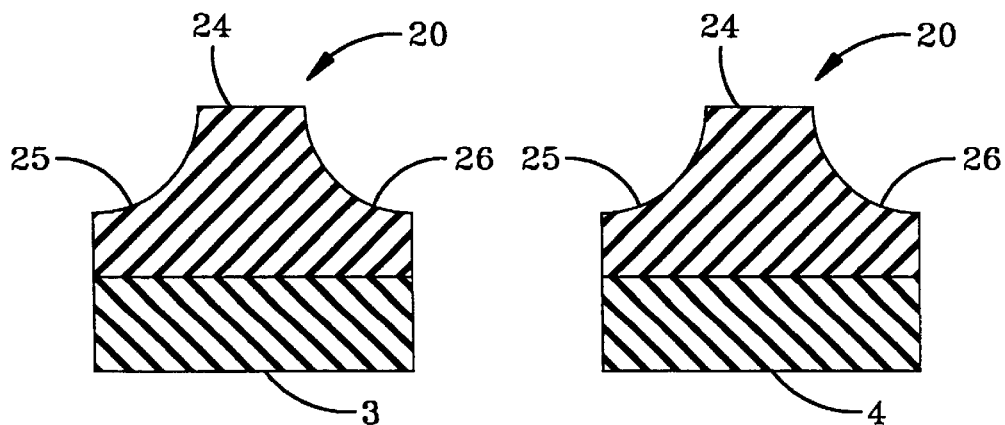
FIG. 8 is a cross-sectional view of a preformed strip with a layer of bottom pulley rubber laminated to the strip.
FIG. 9 is a cross-sectional view of a preformed strip with a layer of top cover rubber laminated to it.

Alternatively, the strip (20) can be transferred onto another layer of rubber (3, 4). As shown in FIGS. 8 and 9 respectively, the preformed strips can be laminated onto a layer of bottom pulley rubber (3) or onto a layer of top cover rubber (4), thus, making specific top strips (20) and bottom strips (20). In such a case, a duplex extruder can be used to simultaneously form the two layers as shown in FIG. 5.

It is believed preferable to transfer the strip (20) onto a carrier member such as liner (50). Most preferably a poly liner (50).

Figure 10:
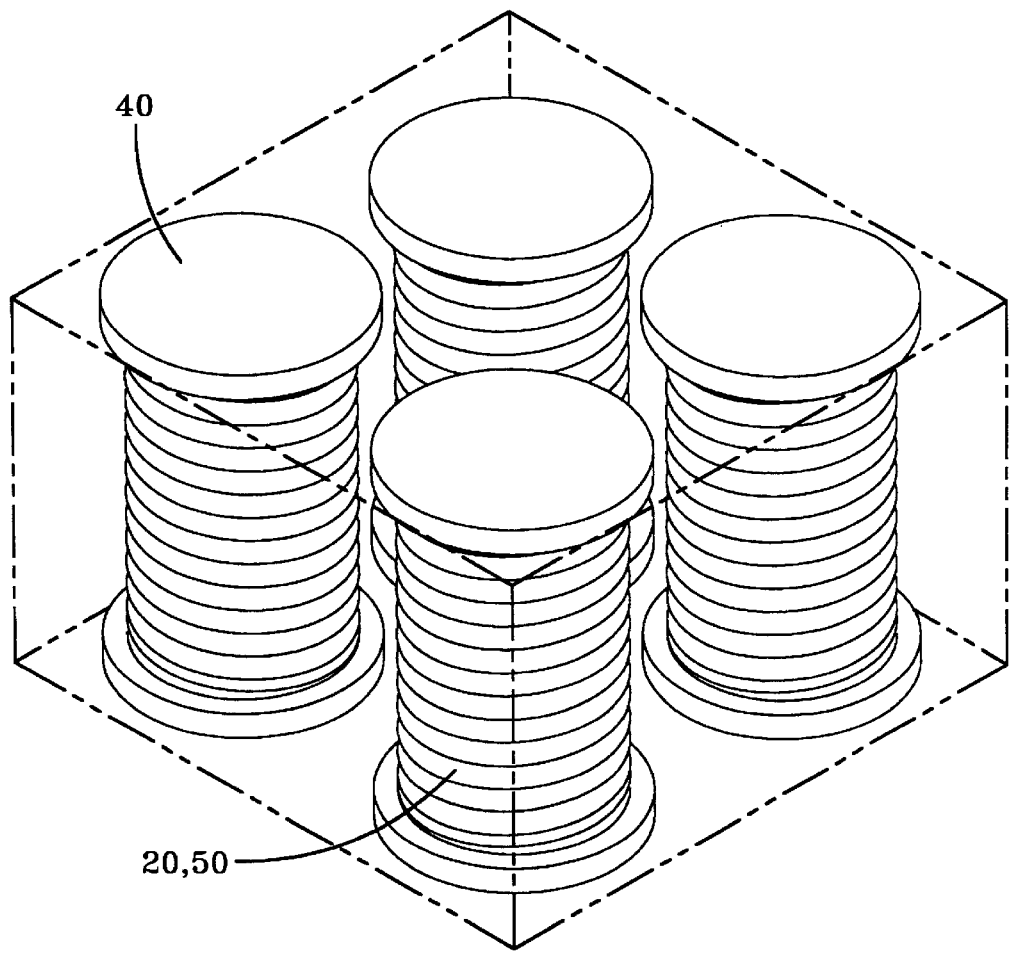
FIG. 10 is a perspective view of the strip on a spool for splicing a joint for a belt reinforced with steel strands embedded in rubber.

As shown in FIG. 10, the strip (20) when placed on a liner (50) can be coiled and spooled. Assuming the strip (20) is attached or transferred onto the liner (50) at the location where it is formed, i.e. at the extruder, then the adhesion to the liner (50) is such that the strip (20) will be securely fixed to the liner (50). This minimized the potential for shipping and handling damage. As shown, the length of strip (20) on a spool should be equal to the amount needed to make a splice joint.

Nevertheless, the principles of forming strips (20) advantageously enables the component to be preformed in a green or uncured state. This insures that the strips (20) can be used without the necessity of using solvents and cements.

What is claimed is:

1. The method of splicing the ends (11, 12) of conveyor belts (10) having vulcanized rubber (12) with steel strands (1) embedded in the vulcanized rubber comprising the steps of:

exposing a plurality of strands (1);

providing two arrays of unvulcanized strips (20) each strip (20) of rubber having a preformed cross-sectional profiles, one array of strips (20) being an array of bottom strips having a plurality of substantially parallel strand receiving grooves (22) the other array of strips (20) being an array of top strips;

placing the exposed strands (1) of the belt ends (11, 12) being joined in the grooves (22) of the one array of bottoms strip (20);

placing the array of top strips (20) overlying the array of bottom strips (20) and vulcanizing the strips (20) together and to strands (1) thereby forming the spliced joint, characterized in that:

the steps of exposing a plurality of strands includes removing a portion of the belt ends to be joined, providing a plurality of bottom strips, each bottom strip having a preformed cross-section of profile having a base width ($W_S$), the base width ($W_S$) being about equal to the cord spacing as measured at cord centers, and two quarter-circular groove portions (22a, 22b) and positioning the plurality of bottom strips adjacently to increase the total width of the plurality of bottom strips and form grooves (22), and cutting one of the bottom strips parallel to the grooves, thereby, substantially matching the total width of the plurality of strips to the conveyor belt width ($W_B$).

2. The method of splicing the ends (11, 12) of a conveyor belt (10) of claim 1 wherein the top strips (20) have grooves (22) similar to the bottom strips (20).

3. The method of splicing the ends (11, 12) of a conveyor belt (10) of claim 1 wherein the top and bottom strips (20) are the same.

4. The method of splicing the ends (11, 12) of a conveyor belt (10) of claim 1 wherein the step of providing the top or bottom strips (20) includes a step of extruding strips (20), to a predetermine profile, the profile having groove potions (22a and 22b).

5. The method of splicing the ends (11, 12) a conveyor belt (10) of claim 1 wherein the step of extruding includes the step of simultaneously forming the bottom strip (20) and a strip of pulley contacting rubber compounds at the extruder, thereby forming a dual compound bottom strip (20).

6. The method of splicing the ends (11, 12) a conveyor belt (10) of claim 1 wherein the step of extruding includes the step of simultaneously forming the top strip (20) and a strip of top cover rubber compound (4), thereby forming a dual compound top strip (20).

* * * * *